US012738040B2

(12) United States Patent
Chen et al.

(10) Patent No.: US 12,738,040 B2
(45) Date of Patent: Sep. 15, 2026

(54) METHOD, SYSTEM AND STORAGE MEDIUM IMPLEMENTING CROSS-MODAL CONTRASTIVE LEARNING TO IMPROVE ITEM CATEGORIZATION BERT MODEL

(71) Applicant: Rakuten Group, Inc., Tokyo (JP)

(72) Inventors: Lei Chen, Tokyo (JP); Hou Wei Chou, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 892 days.

(21) Appl. No.: 17/956,264

(22) Filed: Sep. 29, 2022

(65) Prior Publication Data

US 2024/0119715 A1 Apr. 11, 2024

(51) Int. Cl.
*G06V 10/80* (2022.01)
*G06F 40/40* (2020.01)

(52) U.S. Cl.
CPC ............ *G06V 10/811* (2022.01); *G06F 40/40* (2020.01)

(58) Field of Classification Search
None
See application file for complete search history.

(56) References Cited

U.S. PATENT DOCUMENTS 11,836,163 B1 * 12/2023 Iyer ..................... G06F 16/2365
2022/0083815 A1 * 3/2022 Khanna ................... G06F 18/10
2022/0237368 A1 * 7/2022 Tran ........................ G06F 21/32
2022/0292269 A1 * 9/2022 Niu ......................... G06F 40/47
2022/0327809 A1 * 10/2022 Li ........................... G06F 40/30
2023/0044152 A1 * 2/2023 Chen ....................... G06F 16/35
2023/0109681 A1 * 4/2023 Gotmare ................ G06N 3/047 704/9
2023/0133127 A1 * 5/2023 Balabine ............... G06F 16/285 707/739
2023/0186144 A1 * 6/2023 Lopatecki ............. G06N 20/00 706/12

(Continued)

FOREIGN PATENT DOCUMENTS

JP 2021-157602 A 10/2021
JP 2022-137145 A 9/2022

OTHER PUBLICATIONS

Yu et al. (J. Yu et al. "CoCa: Contrastive Captioners are Image-Text Foundation Models", May-Jun. 2022 Computer Vision and Pattern Recognition (cs.CV); Machine Learning (cs.LG); Multimedia (cs. MM) arXiv:2205.01917 Available online at : https://doi.org/10.48550/arXiv.2205.01917 (Year: 2022).*

(Continued)

*Primary Examiner* — Tahmina N Ansari
(74) *Attorney, Agent, or Firm* — Sughrue Mion, PLLC

(57) ABSTRACT

A method of contrastive learning (CL) performed by at least one processor includes receiving, by at least one processor implementing a text-based transformer, a text title corresponding to an anchor, generating, by the at least one processor implementing the text-based transformer, a text representation of the text title, receiving, by at least one processor implementing an image-based transformer, a first image corresponding to the anchor, generating, by the at least one processor implementing the image-based transformer, a first image representation of the first image corresponding to the anchor, and constructing a positive pair between the text representation and the first image representation.

20 Claims, 5 Drawing Sheets

(56) References Cited

U.S. PATENT DOCUMENTS

| | | | | |
|---|---|---|---|---|
| 2023/0255581 | A1* | 8/2023 | Jang | A61B 6/504 382/128 |
| 2024/0119715 | A1* | 4/2024 | Chen | G06N 3/045 |

OTHER PUBLICATIONS

Yang et al. (J. Yang et al., "Unified Contrastive Learning in Image-Text-Label Space," 2022 IEEE/CVF Conference on Computer Vision and Pattern Recognition (CVPR), New Orleans, LA, USA, 2022, pp. 19141-19151, doi: 10.1109/CVPR52688.2022.01857. Conference dates: Jun. 18-24, 2022. (Year: 2022).*

Office Action issued May 7, 2024 in Japanese Application No. 2023-078894.

* cited by examiner

METHOD, SYSTEM AND STORAGE MEDIUM IMPLEMENTING CROSS-MODAL CONTRASTIVE LEARNING TO IMPROVE ITEM CATEGORIZATION BERT MODEL

BACKGROUND

1. Field

Apparatuses and methods consistent with example embodiments of the present disclosure relate to contrastive learning using an image-based transformer and a text-based transformer.

2. Description of Related Art

Generally, contrastive learning (CL) has been found to be an effective self-supervised learning (SSL) approach for training high-quality representations. For example, in computer vision, some CL models use the consistence between an anchor image and its transformed version and the inconsistence between the anchor and other instances in a batch (negative instances) to guide learning visual representations. Without using labels, the CL models achieve visual representations with a quality on par or even higher than the ones trained based on traditional supervised learning.

CL-based text representation learning for natural language processing (NLP) is of interest. Item categorization (IC) is a core NLP task. To improve IC performance, other metadata, such as product images, have been used. Although multimodal IC (MIC) systems show higher performance, expanding from processing text to more resource-demanding images presents large engineering impacts and hinders the development of dual-input MIC systems.

SUMMARY

According to embodiments, systems and methods are provided for contrastive learning (CL) using an image-based transformer and a modified bidirectional encoder representations from transformers (BERT) model.

According to an aspect of the disclosure, a method of CL performed by at least one processor may include receiving, by at least one processor implementing a text-based transformer, a text title corresponding to an anchor, generating, by the at least one processor implementing the text-based transformer, a text representation of the text title, receiving, by at least one processor implementing an image-based transformer, a first image corresponding to the anchor, generating, by the at least one processor implementing the image-based transformer, a first image representation of the first image corresponding to the anchor, and constructing a positive pair between the text representation and the first image representation.

According to an aspect of the disclosure, a system for CL may include at least one memory storing program code and at least one processor configured to operate as instructed by the program code, the program code including first receiving code configured to cause at least one of the at least one processor to receive, by a text-based transformer, a text title corresponding to an anchor, first generating code configured to cause at least one of the at least one processor to generate, by the text-based transformer, a text representation of the text title, second receiving code configured to cause at least one of the at least one processor to receive, by an image-based transformer, a first image corresponding to the anchor, second generating code configured to cause at least one of the at least one processor to generate, by the image-based transformer, a first image representation of the first image corresponding to the anchor, and first constructing code configured to cause at least one of the at least one processor to construct a positive pair between the text representation and the first image representation.

According to an aspect of the disclosure, a non-transitory computer-readable storage medium may store instructions that, when executed by at least one processor, cause the at least one processor to receive, by a text-based transformer, a text title corresponding to an anchor, generate, by the text-based transformer, a text representation of the text title, receive, by an image-based transformer, a first image corresponding to the anchor, generate, by the image-based transformer, a first image representation of the first image corresponding to the anchor, and construct a positive pair between the text representation and the first image representation, Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
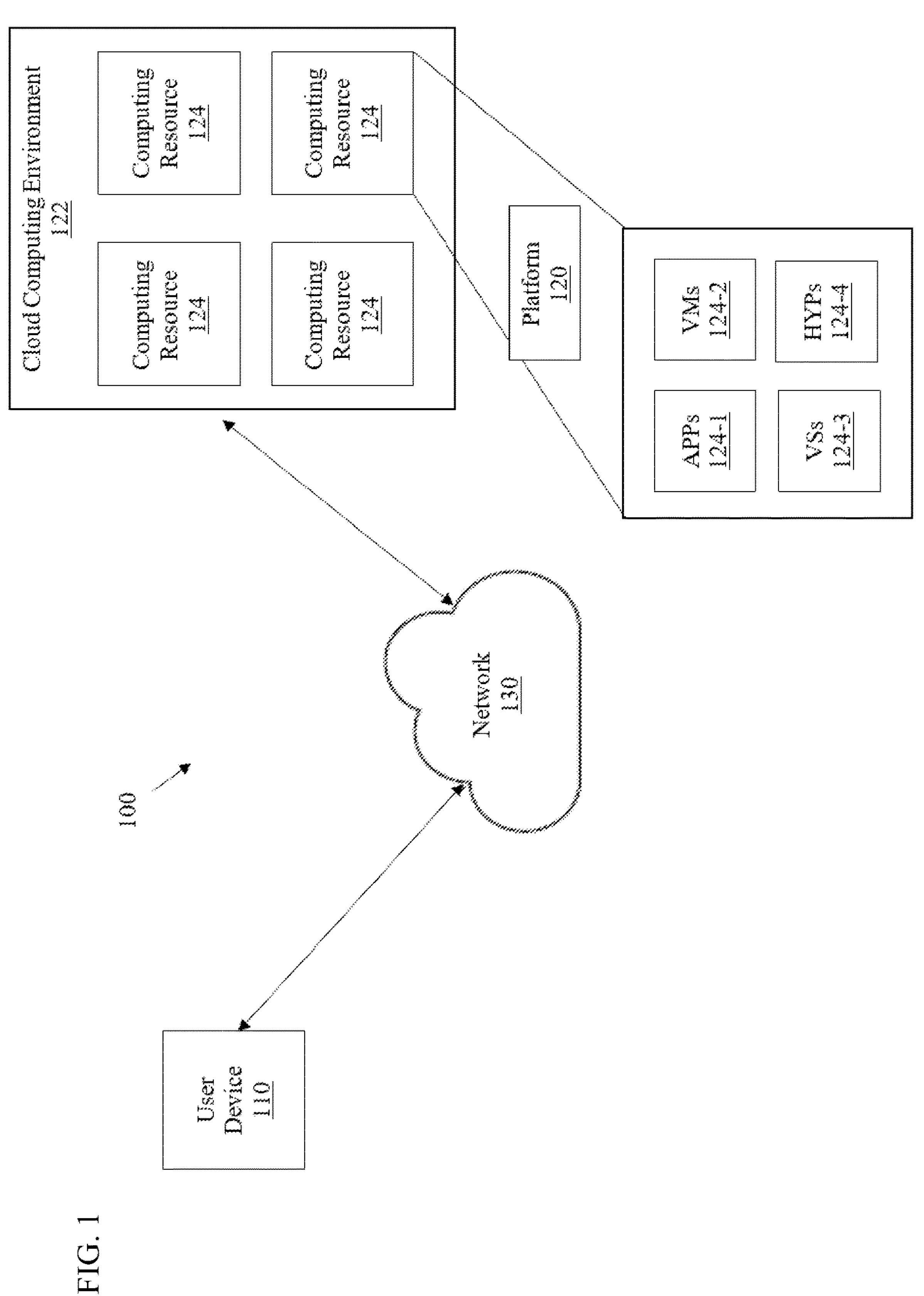
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
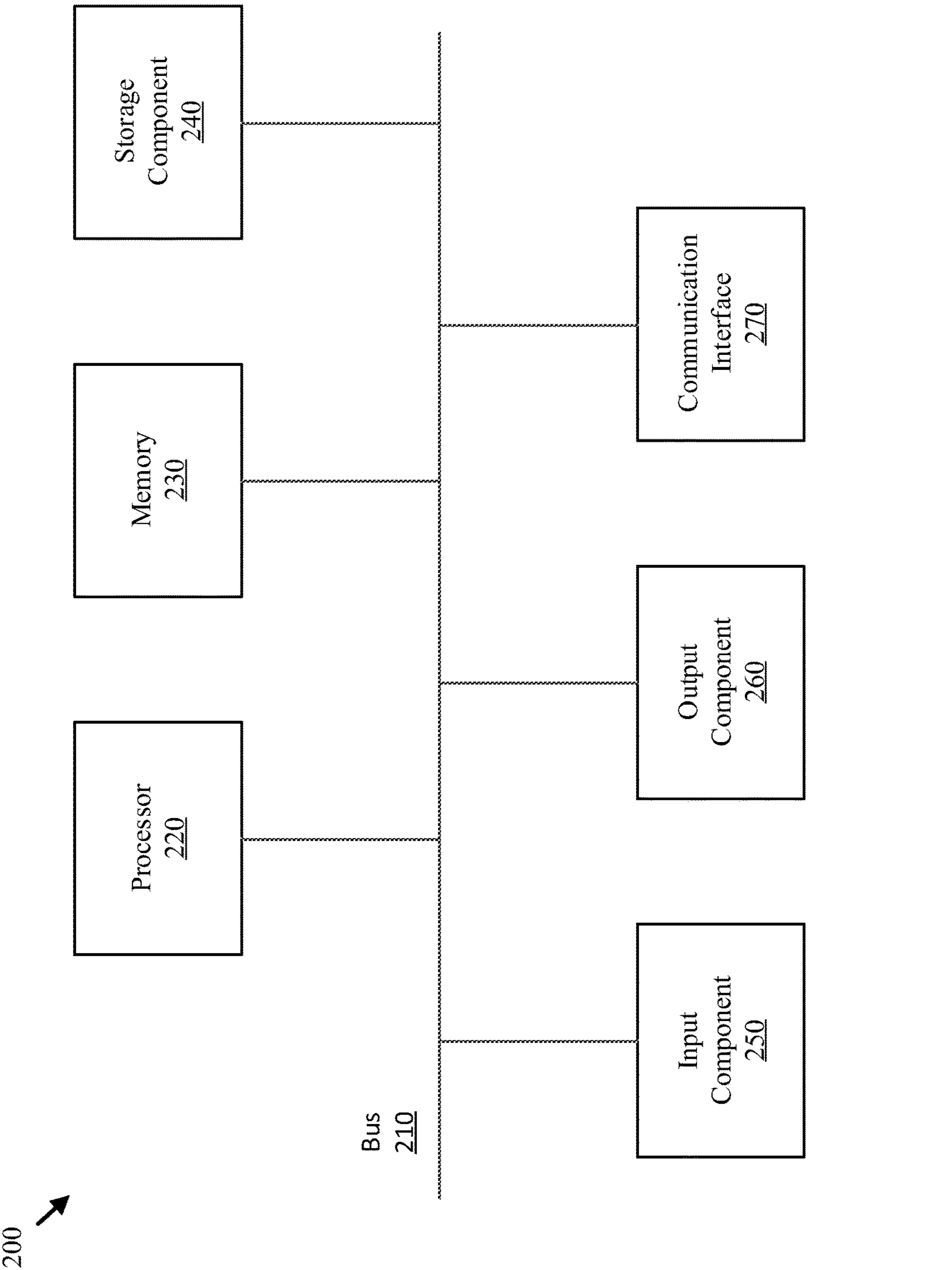
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Item categorization (IC) is a core natural language processing (NLP) technology in e-commerce. Since millions types of products are provided in e-commerce markets, it is important to map these products to their locations in a product category tree efficiently and accurately so that buyers may easily find their interested products. Therefore, IC models with a high accuracy are needed for the success of e-commerce business. Although IC may share the same setup as a text classification task, IC includes unique aspects, including handling a large number of prediction labels, a severely long-tailed distribution of labels, and noisy raw inputs due to the fact that these inputs are generally provided by merchants in a heterogeneous way. These unique aspects make IC a challenging task in practice.

Provided are systems, methods and devices that may implement a novel way of using product images to improve text-only IC models. The systems, methods and devices may leverage cross-modal signals between product titles and associated images to adapt bidirectional encoder representations from transformers (BERT) models in a self-supervised learning (SSL) manner. The provided systems, methods and devices may generate improved prediction accuracy and macro-F1 values over using the original BERT. Moreover, the provided systems, methods, and devices may keep using existing text-only IC inference implementations and demonstrate a resource advantage over the deployment of a dual-input multimodal IC (MIC) systems.

Provided are systems, methods and devices that may run a cross-modal CL, a SSL, between product images and text titles, to adapt pre-trained models and fit the IC task domain better. Then, the adapted pre-trained models may be used to build IC models using the fine-tuning paradigm. Moreover, by using the cross-modal SSL training, images may be used to improve text-based pre-trained models in the model training stage and a series of costly changes/operations in the inference stage may be avoided.

Figure 3:
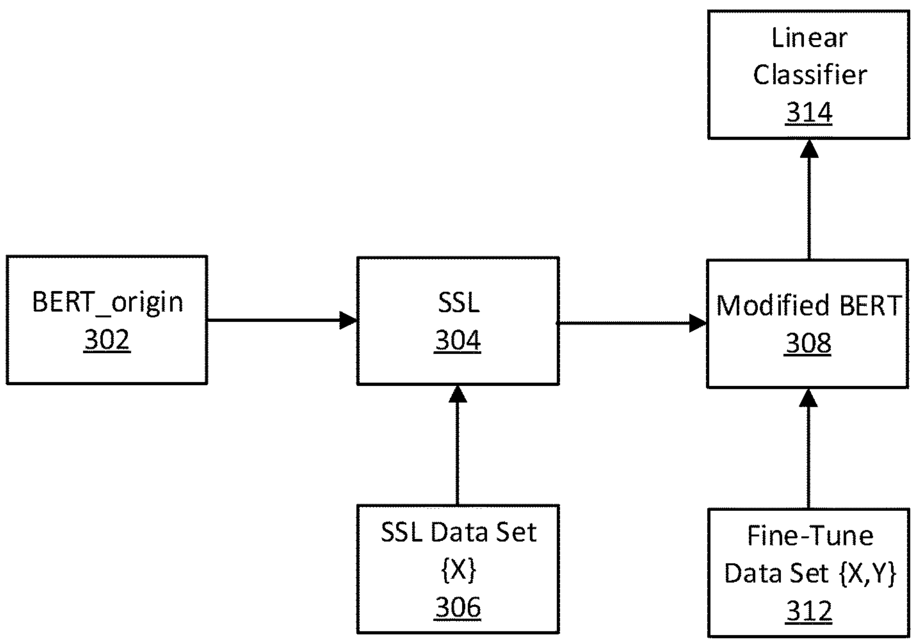
FIG. 3 is a diagram of a self-supervised learning (SSL) model, according to an embodiment.

FIG. 3 is a diagram of an SSL model, according to an embodiment. From a pre-trained BERT model 302 (denoted as BERT_origin), in operation 304, SSL may be performed to further adapt the BERT model 302 to fit better with a fine-tuning task. The SSL may be performed based on an SSL dataset 306. When selecting the data set to be used in the SSL operation 304, due to the self-supervised aspect, the system may not require human-annotated labels. The SSL operation 304 may produce an adapted/modified BERT model 308 (denoted as BERT_adapted). The adapted BERT model 308 may be used to initialize a fine-tuning stage based on a fine-tuning data set 312 (i.e., the adapted BERT model 308 may serve as a textual feature encoder). The IC model, including the adapted BERT model 308 and a linear classifier 314, may be learned jointly by using a cross-entropy loss on the fine-tuning data set 312. The fine-tuning may be conducted to jointly update both the adapted BERT model 308 (for representation learning) and the linear classifier 314.

Figure 4:
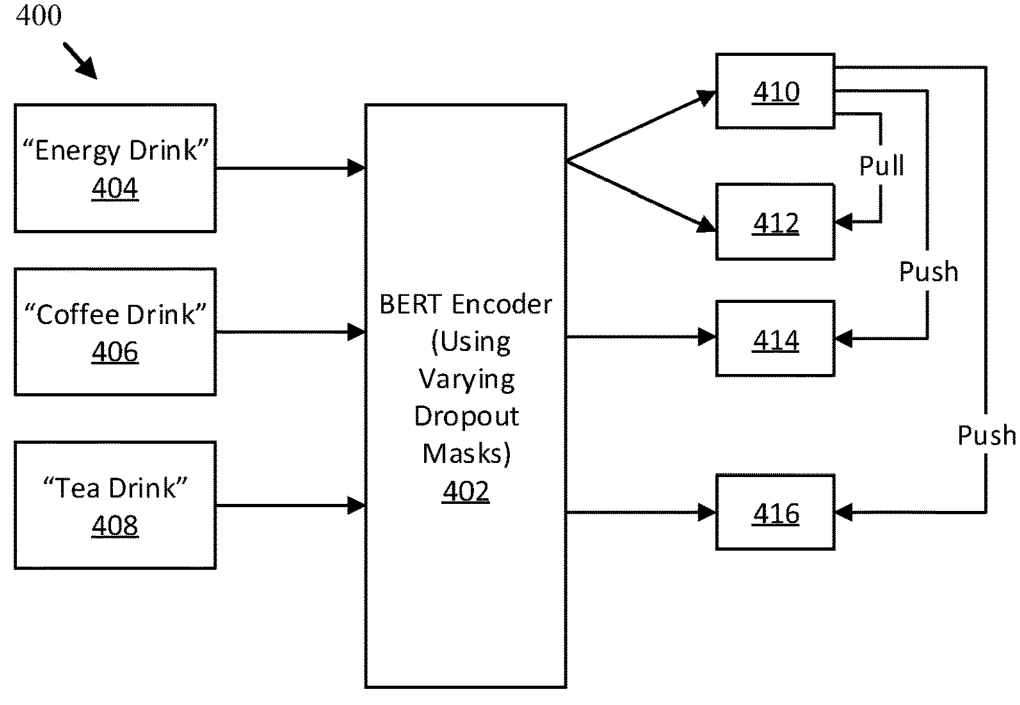
FIG. 4 is a diagram of an SSL model, according to an embodiment.

FIG. 4 is a diagram of an SSL model, according to an embodiment. In the model 400, the BERT encoder 402 may receive multiple text titles, including an energy drink text title 404, a coffee drink text title 406 and a tea drink text title 408. For a text title $x_t$, the system may obtain a text representation t with the BERT encoder 402 $f_t(,d)$, where d is a dropout mask, and obtain a projection function $g_t$, which may use a simple multiple layer perceptron (MLP) structure. The text representation may be given as in Equation (1).

$$t=g_t(f_t(x_t,d)) \tag{1}$$

To obtain a positive pair, the system may run the same text title throughout the transformer encoder pipeline with a different dropout mask $d^+$, as in Equation (2).

$$t^+=g_t(f_t(x_t,d^+)) \tag{2}$$

For an ith text title, the training object may be, as in Equation (3):

$$\mathcal{L}_i^t = -\log\frac{\exp\big(sim(t_i, t_i^+)/\tau\big)}{\sum_{j=1}^{N,j\neq i}\exp\big(sim(t_i, t_j)/\tau\big)} \tag{3}$$

for a miniature batch of N text titles, where sim( ) represents a similarity computation and τ is a temperature parameter. The total loss computed by the model is an average among all text titles in the miniature batch, as in Equation (4).

$$\mathcal{L} = \sum_{i=1}^{N}\mathcal{L}_i^t/N \tag{4}$$

As shown in FIG. 4, the energy drink text title 404 servers as an anchor and is sent to the BERT model 402 twice to obtain two similar but varying text representations 410 and 412 due to the varying drop out masks. The augmented version (e.g., text representation 412) may serve as a positive pair to the anchor (i.e., energy drink text title 404) while the other two text representations 414 and 416 serve as negative pairs. The BERT encoder 402 may be configured/modified to pull positive pairs closer together while pushing negative pairs away. Without any supervision, the BERT encoder 402 may be further adapted to provide a representation better fitting to the SSL data set (e.g., the SSL data set 306).

The system may utilize images that co-exist with the text titles to provide self-supervision signals. The system may utilize an encoder based on a transformer, such as a BERT model. In some embodiments, the system may utilize a pure transformer that is applied directly on a P×P patch sequence. The system may utilize a standard transformer's encoder as an image classification feature extractor, and then may add an MLP head to determine the image labels. The system may be pre-trained using a supervised learning task on a large image data set. The size of the supervised training data set impacts the system performance, and thus the size of the data set may be selected based on the computational bandwidth required or possible by the system. After converting a product image into P×P patches, the system may convert the patches into visual tokens. After adding a special visual token to represent the entire image, the M=P×P+1 long sequence may be fed into the system model to output an encoding, as in Equation (5):

$$v=(v_0,v_1,v_2,\ldots v_M) \tag{5}$$

where M=P×P.

For a product I with text title $x_t$ and an image $x_v$ the system may obtain a visual representation by processing through a visual processing pipeline including an image encoder $f_v$ and a projection layer $g_v$, which may also be an MLP, as in Equation (6):

$$v=g_v(f_v(x_v)) \tag{6}$$

Based on text and image representations, the system may determine a contrastive loss from a text to image direction (i.e., denoted as t→v), as in Equation (7).

$$\mathcal{L}_i^{t\to v} = -\log\frac{\exp\big(sim(t_i, v_i)/\tau\big)}{\sum_{j=1}^{N,j\neq i}\exp\big(sim(t_i, v_j)/\tau\big)} \tag{7}$$

Similarly, the system may determine a contrastive loss from the opposite direction, as in image to text (i.e., denoted as v→t), as in Equation (8).

$$\mathcal{L}_i^{v\to t} = -\log\frac{\exp\big(sim(v_i, t_i)/\tau\big)}{\sum_{j=1}^{N,j\neq i}\exp\big(sim(v_i, t_i)/\tau\big)} \tag{8}$$

An overall loss may be determined as in Equation (9):

$$\mathcal{L} = \sum_{i=1}^{N} (\alpha \mathcal{L}_i^{t \to v} + (1 - \alpha) \mathcal{L}_i^{v \to t}) / N \tag{9}$$

where $\alpha$ is a hyper-parameter to control the two contrastive losses at Equations (7) and (8) to be in the range of [0,1].

Figure 5:
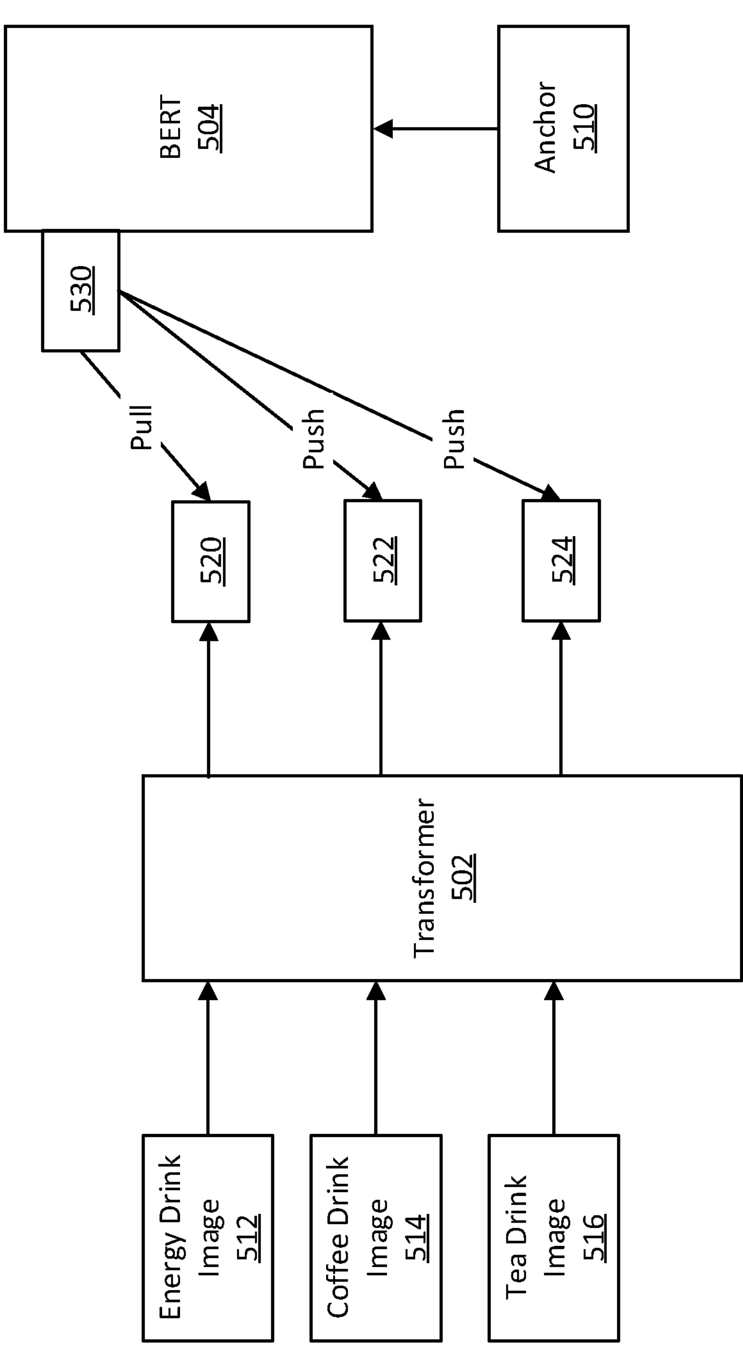
FIG. 5 is a diagram of a system for contrastive learning (CL), according to an embodiment.

FIG. 5 is a diagram of a system for CL, according to an embodiment. The system may include a transformer 502 and a BERT model 504. The BERT model 504 may be adapted/modified as described with respect to FIGS. 3 and 4 above. As shown in FIG. 5, an anchor 510 with a text title "energy drink" is utilized, and its corresponding image 512 may be used as a positive pair. Other images, such as a coffee drink image 514 and a tea drink image 516 may serve as a negative pair. Text representations 522 and 524 corresponding to the coffee drink image 514 and the tea drink image 516, respectively, may serve as a negative pair to a text representation 530 generated by the BERT model 504 based on the text title of the anchor 510, and text representation 520 may serve as a positive pair to the text representation 530.

According to embodiments disclosed herein, in order to improve fine-tuned IC model performance, SSL may be used to adapt original BERT models to better match with the IC task. Regarding the SSL method, to improve the SSL, the system may use cross-modal CL to utilize images for bringing additional modeling power, thereby improving the text representations. The system may use a text title and its associated image as a positive pair whereas other images may be used as negative pairs (e.g., a product image associated with the text title may be a positive pair, whereas other product images in the image set that do not correspond to the text title may be a negative pair). The same cross-modal computation may also be applied on an image to provide a contrastive signal from the other direction. Thus, with the manner in which the system utilizes images, the system may only need to process images during the model training stage, and may deploy only the text-only BERT model (enriched/adapted by SSL training) in the inference stage, which reduces engineering and computation costs.

Figure 6:
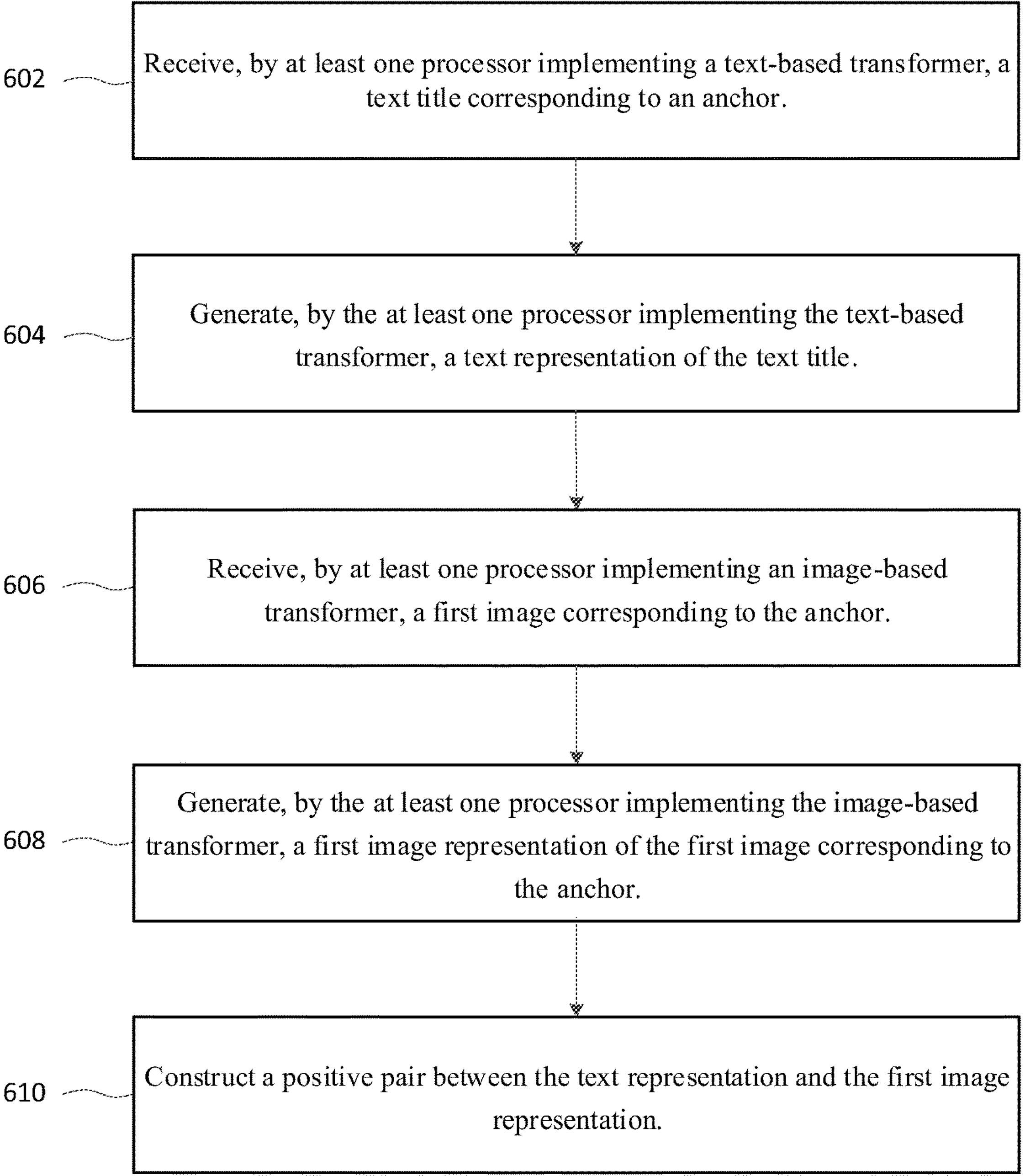
FIG. 6 is a flowchart of a method for CL, according to an embodiment.

FIG. 6 is a flowchart of a method for CL, according to an embodiment. In operation 602, the system may receive, by at least one processor implementing a text-based transformer, a text title corresponding to an anchor. In operation 604, the system may generate, by the at least one processor implementing the text-based transformer, a text representation of the text title. In operation 606, the system may receive, by at least one processor implementing an image-based transformer, a first image corresponding to the anchor. In operation 608, the system may generate, by the at least one processor implementing the image-based transformer, a first image representation of the first image corresponding to the anchor. In operation 610, the system may construct a positive pair between the text representation and the first image representation.

Example embodiments provide In embodiments, any one of the operations or processes of FIGS. 3-6 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of contrastive learning (CL) performed by at least one processor and utilizing an anchor item having a text title, comprising:

receiving, by at least one processor implementing a text-based transformer, the text title corresponding to the anchor;

generating, by the at least one processor implementing the text-based transformer, a text representation of the text title that is different from the text title;

receiving, by at least one processor implementing an image-based transformer, a first image corresponding to the anchor;

generating, by the at least one processor implementing the image-based transformer, a first image representation of the first image corresponding to the anchor, the first image representation being a text representation corresponding to the first image; and constructing a positive pair between the text representation and the first image representation.

2. The method of claim 1, further comprising:

receiving, by the at least one processor implementing the image-based transformer, a second image not corresponding to the anchor;

generating, by the at least one processor implementing the image-based transformer, a second image representation of the second image not corresponding to the anchor; and constructing a negative pair between the text representation and the second image representation.

3. The method of claim 1, further comprising generating a modified bidirectional encoder representations from transformers (BERT) model by applying self-supervised learning (SSL) to a pre-defined BERT model based on a pre-defined SSL data set.

4. The method of claim 3, wherein the text representation is generated based on applying, by the modified BERT, a dropout mask to the text title.

5. The method of claim 1, further comprising determining a first contrastive loss from a text to image direction.

6. The method of claim 5, further comprising determining a second contrastive loss from an image to text direction.

7. The method of claim 6, further comprising determining an overall loss function based on the first contrastive loss, the second contrastive loss, and a hyper-parameter for controlling a range of the first contrastive loss and the second contrastive loss.

8. A system for contrastive learning (CL) utilizing an anchor item having a text title, comprising:

at least one memory storing program code; and at least one processor configured to operate as instructed by the program code, the program code including:

first receiving code configured to cause at least one of the at least one processor to receive, by a text-based transformer, the text title corresponding to the anchor;

first generating code configured to cause at least one of the at least one processor to generate, by the text-based transformer, a text representation of the text title that is different from the text title;

second receiving code configured to cause at least one of the at least one processor to receive, by an image-based transformer, a first image corresponding to the anchor;

second generating code configured to cause at least one of the at least one processor to generate, by the image-based transformer, a first image representation of the first image corresponding to the anchor, the first image representation being a text representation corresponding to the first image; and first constructing code configured to cause at least one of the at least one processor to construct a positive pair between the text representation and the first image representation.

9. The system of claim 8, wherein the program code further comprises:

third receiving code configured to cause at least one of the at least one processor to receive, by the image-based transformer, a second image not corresponding to the anchor;

third generating code configured to cause at least one of the at least one processor to generate, by the image-based transformer, a second image representation of the second image not corresponding to the anchor; and second constructing code configured to cause at least one of the at least one processor to construct a negative pair between the text representation and the second image representation.

10. The system of claim 8, wherein the program code further comprises fourth generating code configured to cause at least one of the at least one processor to generate a bidirectional encoder representations from transformers (BERT) model by applying self-supervised learning (SSL) to a pre-defined BERT model based on a pre-defined SSL data set.

11. The system of claim 10, wherein the text representation is generated based on applying, by the modified BERT, a dropout mask to the text title.

12. The system of claim 8, wherein the program code further comprises first determining code configured to cause at least one of the at least one processor to determine a first contrastive loss from a text to image direction.

13. The system of claim 12, wherein the program code further comprises second determining code configured to cause at least one of the at least one processor to determine a second contrastive loss from an image to text direction.

14. The system of claim 13, wherein the program code further comprises third determining code configured to cause at least one of the at least one processor to determine an overall loss function based on the first contrastive loss, the second contrastive loss, and a hyper-parameter for controlling a range of the first contrastive loss and the second contrastive loss.

15. A non-transitory computer-readable storage medium storing instructions that, when executed by at least one processor, cause the at least one processor to:

receive, by a text-based transformer, a text title corresponding to an anchor item;

generate, by the text-based transformer, a text representation of the text title that is different from the text title;

receive, by an image-based transformer, a first image corresponding to the anchor;

generate, by the image-based transformer, a first image representation of the first image corresponding to the anchor, the first image representation being a text representation corresponding to the first image; and construct a positive pair between the text representation and the first image representation.

16. The storage medium of claim 15, wherein the instructions, when executed, further cause the at least one processor to:

receive, by the image-based transformer, a second image not corresponding to the anchor;

generate, by the image-based transformer, a second image representation of the second image not corresponding to the anchor; and construct a negative pair between the text representation and the second image representation.

17. The storage medium of claim 15, wherein the instructions, when executed, further cause the at least one processor to generate a modified bidirectional encoder representations from transformers (BERT) model by applying self-supervised learning (SSL) to a pre-defined BERT model based on a pre-defined SSL data set.

18. The storage medium of claim 17, wherein the text representation is generated based on applying, by the modified BERT, a dropout mask to the text title.

19. The storage medium of claim 15, wherein the instructions, when executed, further cause the at least one processor to:

determine a first contrastive loss from a text to image direction; and determine a second contrastive loss from an image to text direction.

20. The storage medium of claim 19, wherein the instructions, when executed, further cause the at least one processor to determine an overall loss function based on the first contrastive loss, the second contrastive loss, and a hyper-parameter for controlling a range of the first contrastive loss and the second contrastive loss.

* * * * *